US009672515B2

(12) United States Patent
Hogan et al.

(10) Patent No.: US 9,672,515 B2
(45) Date of Patent: Jun. 6, 2017

(54) METHOD AND SYSTEM FOR SECURE PAYMENTS OVER A COMPUTER NETWORK

(75) Inventors: Edward J. Hogan, Larchmont, NY (US); Carl M. Campbell, Newtown Square, PA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 584 days.

(21) Appl. No.: 09/809,367

(22) Filed: Mar. 15, 2001

(65) Prior Publication Data

US 2002/0007320 A1      Jan. 17, 2002

Related U.S. Application Data

(60) Provisional application No. 60/189,650, filed on Mar. 15, 2000.

(51) Int. Cl.
*G06Q 20/00* (2012.01)
*G06Q 20/38* (2012.01)
*G06Q 20/02* (2012.01)
*G06Q 20/04* (2012.01)
*G06Q 20/14* (2012.01)
*G06Q 20/24* (2012.01)
(Continued)

(52) U.S. Cl.
CPC .......... *G06Q 20/385* (2013.01); *G06Q 20/00* (2013.01); *G06Q 20/02* (2013.01); *G06Q 20/04* (2013.01); *G06Q 20/14* (2013.01); *G06Q 20/24* (2013.01); *G06Q 20/3825* (2013.01); *G06Q 20/3829* (2013.01); *G06Q 30/06* (2013.01); *G06Q 30/0601* (2013.01); *G07F 7/08* (2013.01); *G07F 7/12* (2013.01)

(58) Field of Classification Search
USPC ........................ 705/50, 51, 64, 76, 1, 26, 67
See application file for complete search history.

(56) References Cited

U.S. PATENT DOCUMENTS 3,665,161 A    5/1972  Oberhart
3,845,277 A   10/1974  Voss et al.
(Continued)

FOREIGN PATENT DOCUMENTS

AU       6053700        1/2001
EP       1017030        5/2000
(Continued)

OTHER PUBLICATIONS

U.S. Appl. No. 12/555,688, Apr. 22, 2013 Response to Non-Final Office Action.
(Continued)

*Primary Examiner* — John Hayes
*Assistant Examiner* — John M Winter
(74) *Attorney, Agent, or Firm* — Baker Botts L.L.P.

(57) ABSTRACT

A method of conducting a financial transaction by a purchaser over a communications network is provided where the purchaser does not transmit his or her "real" payment card information over the network but instead secure payment application software is provided which allows for the transmission of a pseudo account number that is cryptographically processed for purposes of responding to an authorization request based on the real account number.

23 Claims, 9 Drawing Sheets

Consumer Software Initialization

(51) Int. Cl.
 *G06Q 30/06* (2012.01)
 *G07F 7/08* (2006.01)
 *G07F 7/12* (2006.01)

(56) References Cited

U.S. PATENT DOCUMENTS

| | | | |
|---|---|---|---|
| 4,016,405 A | 4/1977 | McCune et al. | |
| 4,123,747 A | 10/1978 | Lancto et al. | |
| 4,234,932 A | 11/1980 | Gorgens | |
| 4,253,017 A | 2/1981 | Whitehead | |
| 4,314,352 A | 2/1982 | Fought | |
| 4,390,968 A | 6/1983 | Hennessy et al. | |
| 4,438,326 A | 3/1984 | Uchida | |
| 4,458,142 A | 7/1984 | Bernstein | |
| 4,578,530 A | 3/1986 | Zeidler | |
| 4,755,940 A | 7/1988 | Brachtl et al. | |
| 4,890,323 A | 12/1989 | Baker et al. | |
| 4,926,480 A | 5/1990 | Chaum | |
| 4,928,001 A | 5/1990 | Masada | |
| 4,959,788 A | 9/1990 | Nagata et al. | |
| 4,960,982 A | 10/1990 | Takahira | |
| 5,168,520 A | 12/1992 | Weiss | |
| 5,317,636 A | 5/1994 | Vizcaino | |
| 5,350,906 A | 9/1994 | Brody et al. | |
| 5,357,563 A | 10/1994 | Hamilton et al. | |
| 5,367,572 A | 11/1994 | Weiss | |
| 5,371,797 A | 12/1994 | Bocinsky, Jr. | |
| 5,373,558 A | 12/1994 | Chaum | |
| 5,375,037 A | 12/1994 | Le Roux | |
| 5,434,398 A | 7/1995 | Goldberg | |
| 5,434,919 A | 7/1995 | Chaum | |
| 5,438,186 A | 8/1995 | Nair et al. | |
| 5,440,108 A | 8/1995 | Tran et al. | |
| 5,444,616 A | 8/1995 | Nair et al. | |
| 5,448,047 A | 9/1995 | Nair et al. | |
| 5,455,407 A | 10/1995 | Rosen | |
| 5,530,232 A | 6/1996 | Taylor | |
| 5,538,442 A | 7/1996 | Okada | |
| 5,557,518 A | 9/1996 | Rosen | |
| 5,577,209 A | 11/1996 | Boyle et al. | |
| 5,578,808 A | 11/1996 | Taylor | |
| 5,590,197 A * | 12/1996 | Chen et al. | 705/65 |
| 5,623,552 A | 4/1997 | Lane | |
| 5,671,280 A | 9/1997 | Rosen | |
| 5,678,010 A | 10/1997 | Pittenger et al. | |
| 5,715,314 A | 2/1998 | Payne et al. | |
| 5,724,424 A | 3/1998 | Gifford | |
| 5,754,656 A | 5/1998 | Nishioka et al. | |
| 5,761,306 A | 6/1998 | Lewis | 380/21 |
| 5,761,309 A | 6/1998 | Ohashi et al. | |
| 5,790,677 A | 8/1998 | Fox et al. | 380/24 |
| 5,850,442 A | 12/1998 | Muftic | |
| 5,864,830 A | 1/1999 | Armetta et al. | |
| 5,877,482 A | 3/1999 | Reilly | |
| 5,883,810 A | 3/1999 | Franklin et al. | 364/479.02 |
| 5,903,830 A | 5/1999 | Joao et al. | |
| 5,903,878 A | 5/1999 | Talati et al. | |
| 5,914,472 A | 6/1999 | Foladare et al. | |
| 5,936,226 A | 8/1999 | Aucsmith | |
| 5,953,710 A * | 9/1999 | Fleming | 705/38 |
| 5,956,699 A | 9/1999 | Wong et al. | |
| 5,991,412 A | 11/1999 | Wissenburgh et al. | |
| 5,991,750 A | 11/1999 | Watson | |
| 6,000,832 A | 12/1999 | Franklin et al. | |
| 6,005,942 A | 12/1999 | Chan et al. | |
| 6,012,636 A | 1/2000 | Smith | |
| 6,018,717 A * | 1/2000 | Lee et al. | 705/13 |
| 6,021,943 A | 2/2000 | Chastain | |
| 6,044,360 A | 3/2000 | Picciallo | |
| 6,062,472 A | 5/2000 | Cheung | |
| 6,070,795 A | 6/2000 | Feiken | |
| 6,072,870 A | 6/2000 | Nguyen | |
| 6,078,888 A | 6/2000 | Johnson, Jr. | |
| 6,078,902 A | 6/2000 | Schenkler | |
| 6,098,053 A | 8/2000 | Slater | |
| 6,105,012 A | 8/2000 | Chang et al. | |
| 6,111,953 A | 8/2000 | Walker et al. | |
| 6,122,625 A | 9/2000 | Rosen | |
| 6,163,771 A * | 12/2000 | Walker et al. | 705/18 |
| 6,173,269 B1 | 1/2001 | Solokl et al. | |
| 6,205,436 B1 | 3/2001 | Rosen | |
| 6,206,293 B1 | 3/2001 | Gutman et al. | |
| 6,213,403 B1 | 4/2001 | Bates, III | |
| 6,227,447 B1 | 5/2001 | Campisano | |
| 6,263,446 B1 | 7/2001 | Kausik et al. | |
| 6,298,336 B1 | 10/2001 | Davis et al. | |
| 6,299,062 B1 | 10/2001 | Hwang | |
| 6,324,525 B1 | 11/2001 | Kramer et al. | |
| 6,324,526 B1 | 11/2001 | D'Agostino | |
| 6,327,578 B1 * | 12/2001 | Linehan | 705/65 |
| 6,332,134 B1 | 12/2001 | Foster | |
| 6,339,766 B1 | 1/2002 | Gephart | |
| 6,343,279 B1 | 1/2002 | Bissonette et al. | |
| 6,343,284 B1 | 1/2002 | Ishikawa et al. | |
| 6,367,011 B1 | 4/2002 | Lee et al. | |
| 6,370,514 B1 | 4/2002 | Messner | |
| 6,394,343 B1 | 5/2002 | Berg et al. | |
| 6,422,462 B1 | 7/2002 | Cohen | |
| 6,473,740 B2 | 10/2002 | Cockrill et al. | |
| 6,484,182 B1 | 11/2002 | Dunphy et al. | |
| 6,510,983 B2 | 1/2003 | Horowitz et al. | |
| 6,518,927 B2 | 2/2003 | Schremmer et al. | |
| 6,574,730 B1 | 6/2003 | Bissell et al. | |
| 6,592,044 B1 | 7/2003 | Wong et al. | |
| 6,598,031 B1 | 7/2003 | Ice | |
| 6,607,127 B2 | 8/2003 | Wong | |
| 6,609,654 B1 | 8/2003 | Anderson et al. | |
| 6,636,833 B1 * | 10/2003 | Flitcroft | G06Q 20/00 235/380 |
| 6,755,341 B1 | 6/2004 | Wong et al. | |
| 6,782,473 B1 | 8/2004 | Park | |
| 6,805,288 B2 | 10/2004 | Routhenstein et al. | |
| 6,811,082 B2 | 11/2004 | Wong | |
| 6,814,593 B2 | 11/2004 | Wang et al. | |
| 6,901,387 B2 | 5/2005 | Wells et al. | |
| 6,908,030 B2 | 6/2005 | Rajasekaran et al. | |
| 6,915,279 B2 | 7/2005 | Hogan et al. | |
| 6,931,382 B2 | 8/2005 | Laage et al. | |
| 6,941,285 B2 | 9/2005 | Sarcanin | |
| 6,961,858 B2 | 11/2005 | Fransdonk | |
| 6,990,470 B2 | 1/2006 | Hogan et al. | |
| 7,020,635 B2 | 3/2006 | Hamilton et al. | |
| 7,043,635 B1 | 5/2006 | Keech | |
| 7,058,611 B2 | 6/2006 | Kranzley et al. | |
| 7,080,049 B2 | 7/2006 | Truitt et al. | |
| 7,090,128 B2 | 8/2006 | Farley et al. | |
| 7,107,462 B2 | 9/2006 | Fransdonk | |
| 7,136,835 B1 | 11/2006 | Flitcroft et al. | |
| 7,150,045 B2 | 12/2006 | Koelle et al. | |
| 7,171,694 B1 | 1/2007 | Jespersen et al. | |
| 7,177,848 B2 | 2/2007 | Hogan et al. | |
| 7,181,432 B2 | 2/2007 | Wells et al. | |
| 7,225,156 B2 | 5/2007 | Fisher et al. | |
| 7,319,986 B2 | 1/2008 | Praisner et al. | |
| 7,379,919 B2 | 5/2008 | Hogan et al. | |
| 7,392,388 B2 | 6/2008 | Keech | |
| 7,565,308 B1 * | 7/2009 | Bollay | 705/26.41 |
| 7,571,142 B1 | 8/2009 | Flitcroft et al. | |
| 7,587,502 B2 | 9/2009 | Crawford et al. | |
| 7,593,896 B1 | 9/2009 | Flitcroft et al. | |
| 7,711,586 B2 | 5/2010 | Aggarwal et al. | |
| 2001/0029485 A1 * | 10/2001 | Brody et al. | 705/39 |
| 2001/0034720 A1 | 10/2001 | Armes | |
| 2001/0037451 A1 | 11/2001 | Bhagavatula et al. | |
| 2001/0047281 A1 | 11/2001 | Keresman, III et al. | |
| 2001/0047335 A1 | 11/2001 | Arndt et al. | |
| 2001/0051902 A1 | 12/2001 | Messner | |
| 2001/0056409 A1 | 12/2001 | Bellovin et al. | |
| 2002/0016749 A1 | 2/2002 | Borecki et al. | |
| 2002/0023023 A1 | 2/2002 | Borecki et al. | |
| 2002/0029342 A1 | 3/2002 | Keech | |
| 2002/0032663 A1 | 3/2002 | Messner | |

(56) References Cited

U.S. PATENT DOCUMENTS

| | | |
|---|---|---|
| 2002/0035548 A1 | 3/2002 | Hogan et al. |
| 2002/0046169 A1 | 4/2002 | Keresman, III et al. |
| 2002/0052784 A1 | 5/2002 | Sherwin et al. |
| 2002/0059146 A1 | 5/2002 | Keech |
| 2002/0073042 A1 | 6/2002 | Maritzen et al. |
| 2002/0073045 A1 | 6/2002 | Rubin et al. |
| 2002/0083010 A1 | 6/2002 | Kim |
| 2002/0120584 A1 | 8/2002 | Hogan et al. |
| 2002/0133467 A1* | 9/2002 | Hobson et al. ............... 705/64 |
| 2003/0061168 A1 | 3/2003 | Routhenstein |
| 2003/0120615 A1 | 6/2003 | Kuo |
| 2003/0126094 A1 | 7/2003 | Fisher et al. |
| 2003/0167207 A1 | 9/2003 | Berardi et al. |
| 2003/0208406 A1 | 11/2003 | Okamoto et al. |
| 2004/0210449 A1 | 10/2004 | Breck et al. |
| 2008/0065554 A1 | 3/2008 | Hogan et al. |
| 2010/0223186 A1 | 9/2010 | Hogan et al. |
| 2010/0228668 A1 | 9/2010 | Hogan et al. |

FOREIGN PATENT DOCUMENTS

| | | |
|---|---|---|
| EP | 1028401 | 8/2000 |
| JP | 11039401 | 2/1999 |
| JP | 11203323 | 7/1999 |
| JP | 2000036013 | 2/2000 |
| JP | 2002117353 | 4/2002 |
| WO | WO92/16913 | 10/1992 |
| WO | WO99/05633 | 2/1999 |
| WO | WO99/64996 | 12/1999 |
| WO | WO00/33497 | 6/2000 |
| WO | WO 01/01622 A2 | 1/2001 |
| WO | WO 01/07873 A2 | 2/2001 |
| WO | WO 01/26062 A1 | 4/2001 |
| WO | WO 01/84509 A2 | 8/2001 |
| WO | WO 01/67215 A2 | 9/2001 |
| WO | WO01/69556 | 9/2001 |
| WO | WO01/71675 | 9/2001 |
| WO | WO01/78024 | 10/2001 |
| WO | WO 01/84509 A2 | 11/2001 |
| WO | WO01/84763 | 11/2001 |
| WO | WO 02/15077 A1 | 2/2002 |
| WO | WO03/007623 | 1/2003 |

OTHER PUBLICATIONS

U.S. Appl. No. 11/943,062 (US 2008/0065554), filed Nov. 20, 2007 (Mar. 13, 2008).
U.S. Appl. No. 12/555,619 (US 2010/0223186), filed Sep. 8, 2009 (Sep. 2, 2010).
U.S. Appl. No. 12/555,688 (US 2010/0228668), filed Sep. 8, 2009 (Sep. 9, 2010).
U.S. Appl. No. 11/943,062, Sep. 28, 2010 Petition for Review by the Office of Petitions.
U.S. Appl. No. 11/943,062, Sep. 28, 2010 Amendment and Request for continued Examination (RCE).
U.S. Appl. No. 11/943,062, Mar. 18, 2010 Final Office Action.
U.S. Appl. No. 11/943,062, Dec. 23, 2009 Response to Non-Final Office Action.
U.S. Appl. No. 11/943,062, Jun. 24, 2009 Non-Final Office Action.
U.S. Appl. No. 12/555,619, Jun. 25, 2012 Response to Non-Final Office Action.
U.S. Appl. No. 12/555,619, Dec. 23, 2011 Non-Final Office Action.
U.S. Appl. No. 12/555,688, Dec. 21, 2012 Non-Final Office Action.
The Bank Credit Card Business, 2nd Edition, American Bankers Association, Washington, D.C., 1996. All pages.
Prenell et al., "On the Security of Iterated Message Authentication Codes," 1999, IEEE.
Bruce Schneier, "Applied Cryptography," John Wiley & Sons, Inc., New York, XP002188917, pp. 455-459.
White, "How Computers Work," Millennium Edition, 1999, Que Corporation, Indianapolis, IN, all pages.
Derfler, "How Networks Work," Bestseller Edition, 1996, Ziff-Davis Press, Emeryville, CA, all pages.
Gralla, "How the Internet Works," Millennium Edition, 1999, Que Corporation, Indianapolis, IN, all pages.
Muller, "Desktop Encyclopedia of the Internet," 1999, Artech House Inc., Norwood, MA, all pages.
Menezes et al., "Handbook of Applied Cryptography," CRC Press, 1997, all pages.
Rankl et al., "Smart Card Handbook," Second Edition, Wiley, 2000, all pages.
"Flatpack Transponder", 2001 Mark IV Industries, Ltd., Ontario, Canada, 2 pages.
"EMV '96 Integrated Circuit Card Specifications for Payment Systems," EMV '96, 1996, XP002363289, pp. 132-143.
Handbook of Applied Cryptography, Jan. 1, 1997, Chapter 10, pp. 400-403; XP002976533.

* cited by examiner

Consumer Software Initialization

Secret Key Authentication

Public Key Authentication

Pseudo Acct No. Generation

Real Acct No. Generation

Secret Key Authentication

Public Key Authentication

Clearing & Settlement

Exception Processing

METHOD AND SYSTEM FOR SECURE PAYMENTS OVER A COMPUTER NETWORK

PRIORITY APPLICATION

This application claims priority to U.S. provisional application 60/189,650, filed on Mar. 15, 2000, and entitled "Method and System for Secure Payments Over a Computer Network," which is hereby incorporated by reference.

BACKGROUND OF INVENTION

This invention relates to a method and system for conducting secure financial transactions over a communications network and more particularly to a method and system for transmitting payments securely over a computer network, such as the Internet, and for transmitting sensitive information securely over public communication channels.

As is self-evident, on-line commerce has experienced tremendous growth over the last few years but even with that growth consumers are still troubled and concerned about using personal financial information and transmitting such information, such as credit card numbers and personal identification numbers, over public communications networks, such as the Internet. As a result, over the last few years, companies have struggled to find a way—the best way—to ensure the security of payments made over a computer network and to decrease the risk of theft or misuse of financial information.

For example, U.S. Pat. No. 5,883,810 entitled "Electronic Online Commerce Card With Transaction Proxy Number For Online Transactions" and assigned to Microsoft Corporation, is directed to a system which provides for each transaction a temporary transaction number and associates it with the permanent account number; the transaction number looks like a real credit card number and the customer uses that transaction number and submits it to the merchant as a proxy for the customer account number. In this matter, the customer does not have to transmit over a public network his or her real credit card number.

In the '810 patent, the merchant passes along the transaction number to the issuing institution, which in turn uses the transaction number as an index, accesses the real customer account number and processes the authorization, sending the authorization reply back to the merchant under the transaction number. As a result, risk is purportedly minimized not only because the customer only transmits a transaction number but also because the proxy number is good only for a single purchase—theft "would not greatly benefit a thief because it cannot be repeatedly used for other purchases or transactions." Col. 2, lines 60-61.

There is still a need to improve upon the prior art systems and in particular there is a need for a method and system for conducting a secure financial transaction over the Internet which avoids requiring the creation and transmission of a unique repeatedly generated transaction number to replace the transmission of the permanent account number for each conducted transaction.

SUMMARY OF THE INVENTION

According to the present invention, a "pseudo" account number is assigned to a customer and cryptographically linked to a consumer's payment account number. The payment account number is an account number issued by a financial institution or other organization that a consumer may use to make a payment for goods and/or services. For example, the payment account number may be the account number from a payment card, such as a credit or debit card, or from a payment application, such as an electronic cash application stored on a consumer's computer. The pseudo account number appears to be an actual payment account number to a merchant. That is, the pseudo account number has the same length as a valid payment account number and begins with a valid identification number (e.g., a "5" for MasterCard International Incorporated ("MasterCard")). The pseudo account number is used by the customer instead of the real account number for all of his or her on-line financial transactions.

All transactions based on pseudo account numbers are preferably cryptographically authenticated using a secret key that is unique for each account number. The authentication may be based on the private key of a public-key pair ("public-key authentication"), or based on a secret key other than a private key ("secret-key authentication"). Thus, if unauthorized persons were to ascertain any pseudo account numbers, they would be unable to make fraudulent transactions using them.

BRIEF DESCRIPTION OF THE DRAWINGS

Further objects, features and advantages of the invention will become apparent from the following detailed description taken in conjunction with the accompanying figures showing a preferred embodiment of the invention, on which.

Figure 1:
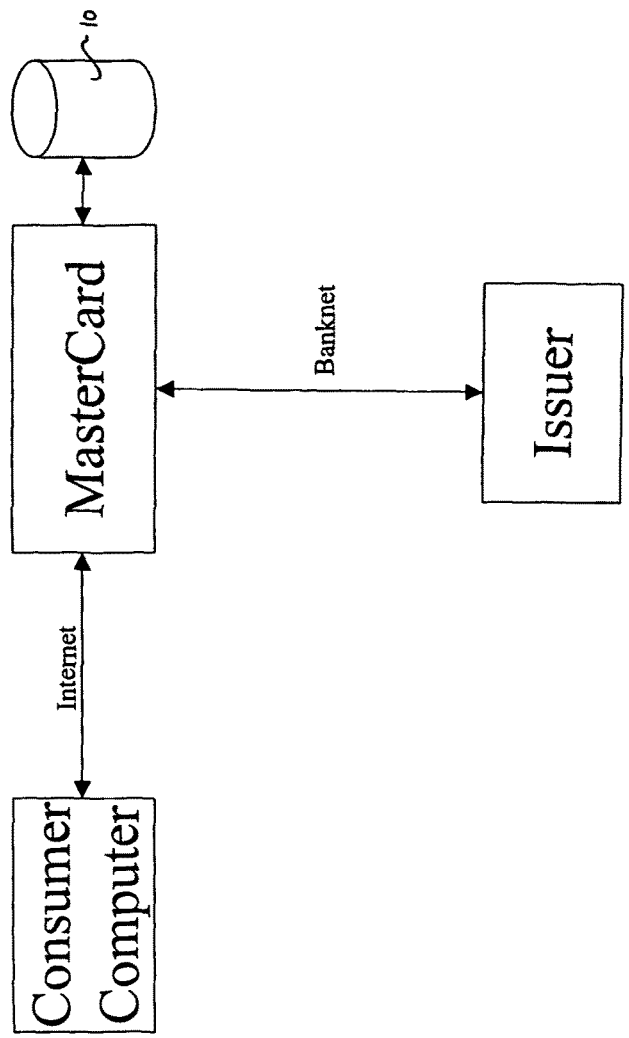
FIG. 1 is a block diagram of the system for obtaining a secure payment application from a provider over the Internet in accordance with the invention.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION OF THE PREFERRED EMBODIMENT

FIG. 1 illustrates an initial setup whereby a consumer who has, in this instance, a MasterCard financial transaction card decides to obtain a secure payment application from a secure payment application provider, such as MasterCard, over the Internet. The reader should understand that although there is repeated reference in the specification and Figures to MasterCard this is by way of example only.

As shown in FIG. 1, a provider, such as MasterCard (or an agent of MasterCard) has in its control one or more tamper-resistant security modules 10, which offer physical protection for the information stored inside the modules. These security modules each contain the following secret keys: 1) one or more translation keys that are used to translate between pseudo account numbers and "real" account numbers; 2) if secret-key authentication is used, one or more derivation keys that are used to re-create the card-unique secret cryptographic keys; and 3) if public-key authentication is used, one or more provider "root" private keys. The process, then, would preferably proceed as follows:

The cardholder contacts MasterCard's web site via the Internet.

The cardholder identifies himself/herself to MasterCard by providing, preferably under Secure Socket Layer (SSL) encryption known to those skilled in the art, the card account number, card expiration date, and card verification code or CVC2 from his/her MasterCard card. CVC2 refers to authenticating information that is issued with some payment cards. These cards have the account number printed on the signature panel of the card followed by a three or four digit value. This value is generated by the issuing bank using a secret cryptographic key, and can be verified using this same key. Payment card brands have varying names for the value: MasterCard—Card Verification Code 2 (CVC2); American Express—Four-digit batch code (4DBC); and Visa—Card Verification Value 2 (CVV2). Supplying this value provides evidence that the person participating in a transaction had physical possession of the card at some point in time, because the value is not encoded on the magnetic stripe and thus not included in a normal transaction.

MasterCard verifies the CVC2 for the cards of those issuers for which MasterCard is provided (by secure means) the CVC2 keys. MasterCard may confirm the legitimacy of the other card data by obtaining a zero amount authorization from the issuer. MasterCard may obtain this authorization over its Banknet™ communications network.

After MasterCard has confirmed the legitimacy of the cardholder-provided card data, the secure payment application software is made available to the cardholder and may be downloaded over the Internet under SSL encryption. The software includes a secret cryptographic key that is unique to this card. If secret-key authentication is used, the secret key is preferably determinable from the card's "real" account number (i.e., the actual card payment account number issued by the cardholder's issuing bank). If public-key authentication is used, MasterCard provides a certificate that links the real account number with the corresponding public key, which certificate is signed by a MasterCard "root" private key. The software also includes the cardholder's "real" account number, and a "pseudo" account number that MasterCard may relate to the "real" account number.

The cardholder may provide a password to MasterCard prior to downloading the secure payment application or may select a password when the secure payment application is being installed on the cardholder's computer. If a password is provided or selected, the cardholder will thereafter be required to enter this password in order to activate the secure payment application.

If secret-key authentication is used, the card-unique secret key may be cryptographically computed from the card's "real" account number using a higher-level secret cryptographic key that is common to many or all account numbers. The higher-level secret cryptographic key preferably resides solely within physically-secure and tamper-resistant hardware devices (referred to as "security modules") that are controlled by MasterCard or by acquirer institutions. If the secure payment application includes a card-unique private key (for public-key authentication), the associated certificate is signed using a MasterCard private "root" key that resides only in a relatively few security modules that are controlled directly by MasterCard or by trusted agents to whom MasterCard has delegated this certificate-signing function.

The pseudo account number has the same length as the "real" account number, consists solely of decimal digits, and begins with a valid identification number (e.g., a "5" for MasterCard). Therefore, the pseudo account number will appear to be a valid account number to merchants.

In order for an acquirer or MasterCard to be able to differentiate between a "real" account number and a pseudo account number, there must be an indication in the account number or in the transaction record of the type of account number being used. In one embodiment of the present invention, this indication is provided in the second digit of the pseudo account number, which acts as a special identifier. For example, for MasterCard cards, the second digit of an account number may be made a "9" to indicate a pseudo account number. In this case, the 16th digit of the account number, which is normally a check digit used to detect manual entry errors, is deleted to make room for the additional second digit.

In some cases, it may be possible that the transaction record may include data indicating that the account number is a pseudo account number.

MasterCard may periodically update the secure payment application.

If secret-key authentication is used, the following steps may be performed within a security module controlled by MasterCard or one of its agents to obtain a card-unique secret key to be included in the MasterCard secure payment application. The following steps assume the use of the DEA (Data Encryption Algorithm, which is a U.S. Government standard cryptographic algorithm) with a double-length key. They also assume that the MasterCard security module holds a secret high-level key called the Per-Card Key Derivation Key that consists of 16 bytes and is used with many or all card account numbers to cryptographically compute a card-unique secret key, called the Per-Card Key, given the card's 16-digit payment account number. The steps are:

1. Considering the payment account number as 16 binary-coded-decimal digits of 4 bits each, DEA-encrypt these 64 bits using as the encryption key the left-most 8 bytes of the 16-byte Per-Card Key Derivation Key.
2. DEA-decrypt the result of Step 1 using as the decryption key the right-most 8 bytes of the 16-byte Per-Card Key Derivation Key.
3. DEA-encrypt the result of Step 2 using as the encryption key (again) the left-most 8 bytes of the 16-byte Per-Card Key Derivation Key.
4. Use the result of Step 3 as the left-most 8 bytes of the unique Per-Card Key.
5. DEA-encrypt the result of Step 3 using as the encryption key the left-most 8 bytes of the 16-byte Per-Card Key Derivation Key.
6. DEA-decrypt the result of Step 5 using as the decryption key the right-most 8 bytes of the 16-byte Per-Card Key Derivation Key.
7. DEA-encrypt the result of Step 6 using as the encryption key (again) the left-most 8 bytes of the 16-byte Per-Card Key Derivation Key.
8. Use the result of Step 7 as the right-most 8 bytes of the 16-byte unique Per-Card Key, and place this key in the secure payment application in such a way that it will not be disclosed during the normal operation of this application.

If public-key authentication is used, the following steps may be performed within a security module controlled by MasterCard or one of its agents to provide a card-unique private key and a card-unique certificate for the corresponding public key, which private key and certificate are to be included in the MasterCard secure payment application:

1. For a recognized public-key algorithm (e.g. RSA, Elliptic Curve), compute a unique private key and the corresponding public key using established security procedures.
2. Using a recognized secure hash algorithm (e.g. SHA-1), hash, for example, (1) the just-generated public key for the card in question, (2) the pseudo account number for this card, (3) an appropriate date (to be optionally used to determine certificate expiration) and (4) the identity of the current MasterCard "root" key (in the event that this key should change).
3. Using a recognized public key algorithm, and a MasterCard "root" private key, create a digital signature on the result of Step 2 (with appropriate padding).
4. In the per-card secure payment application, place the just-generated private key in such a way that it cannot be disclosed in normal operation. Also place in this secure payment application a digital certificate consisting of (for example) (1) the card-unique public key, (2) the card's pseudo account number, (3) the above-indicated date, (4) the identity of the MasterCard "root" key used to sign the certificate, and (4) the above-described digital signature.

Figure 2A:
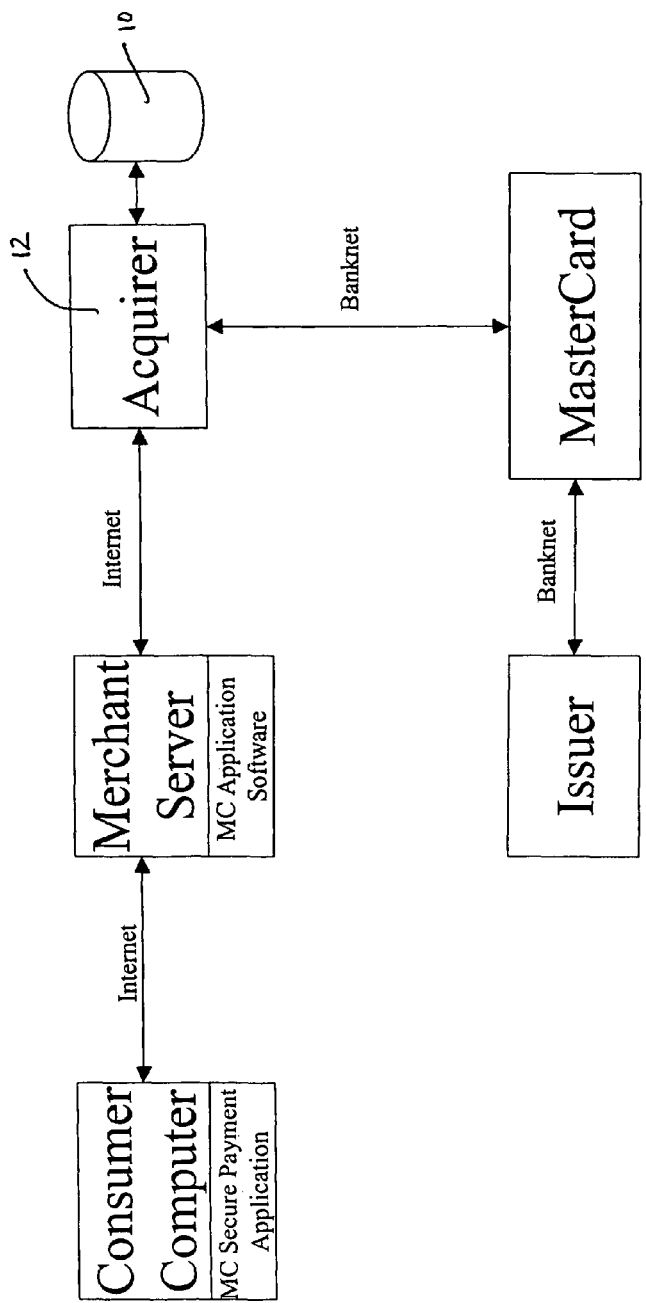
FIG. 2A is a block diagram of the system for conducting a secure payment over the Internet using the present invention with secret-key authentication of pseudo account numbers, in accordance with the invention.

FIG. 2a is a diagram of a system for conducting a secure payment over the Internet using the present invention with secret-key authentication of pseudo account numbers.

As shown in FIG. 2a, an acquirer 12 has in its control one or more tamper-resistant security modules, which offer physical protection for the information stored inside the modules. These security modules each contain one or more secret keys, the translation key or keys, that are used to translate between pseudo account numbers and "real" account numbers. Each of these modules also contain one or more higher-level secret keys, called the derivation key or keys, that are used to re-create the card-unique secret cryptographic keys.

The modules may be provided by MasterCard to the acquirer and may function similarly to the security modules currently installed in banks that operate Cirrus automatic teller machines (ATMs). MasterCard provides to the acquirer a security specification and/or software application, which the acquirer may make available to merchants that desire to accept MasterCard cards with pseudo account numbers. Although it is preferred for an acquirer to have a security module, it is not required. If a security module is not provided to an acquirer, the acquirer will be required to forward all pseudo account numbers to MasterCard for translation and authentication.

Figure 2B:
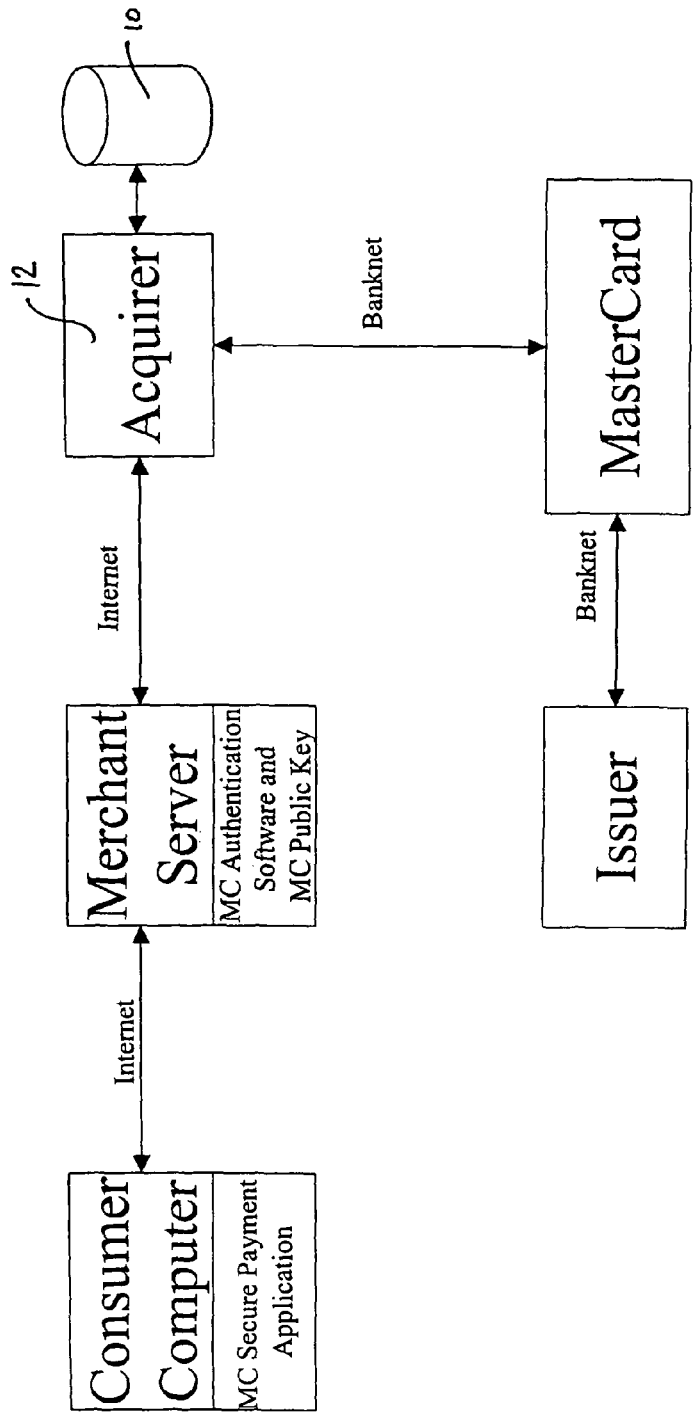
FIG. 2B is a block diagram of the system for conducting a secure payment over the Internet using the present invention with public-key authentication of pseudo account numbers, in accordance with the present invention.

FIG. 2B is a diagram of a system for conducting a secure payment over the Internet using the present invention with public-key authentication of pseudo account numbers. As shown in FIG. 2b, the only significant difference with FIG. 2a is that a public-key pair is utilized. Like before, the acquirer 12 has in its control one or more tamper-resistant security modules 10, which offer physical protection for the information stored inside the modules. These security modules each contain one or more secret keys, i.e., the translation key or keys, that are used to translate between pseudo account numbers and "real" account numbers. Like above, the modules are provided by MasterCard to the acquirer and may function similarly to the security modules currently installed in banks that operate Cirrus automatic teller machines (ATMs). MasterCard provides to the acquirer a security specification and/or software application, which the acquirer may make available to merchants that desire to accept MasterCard cards with pseudo account numbers. Although it is preferred for an acquirer to have a security module, it is not required. If a security module is not provided to an acquirer, the acquirer will be required to forward all pseudo account numbers to MasterCard for translation and authentication.

Figure 3A:
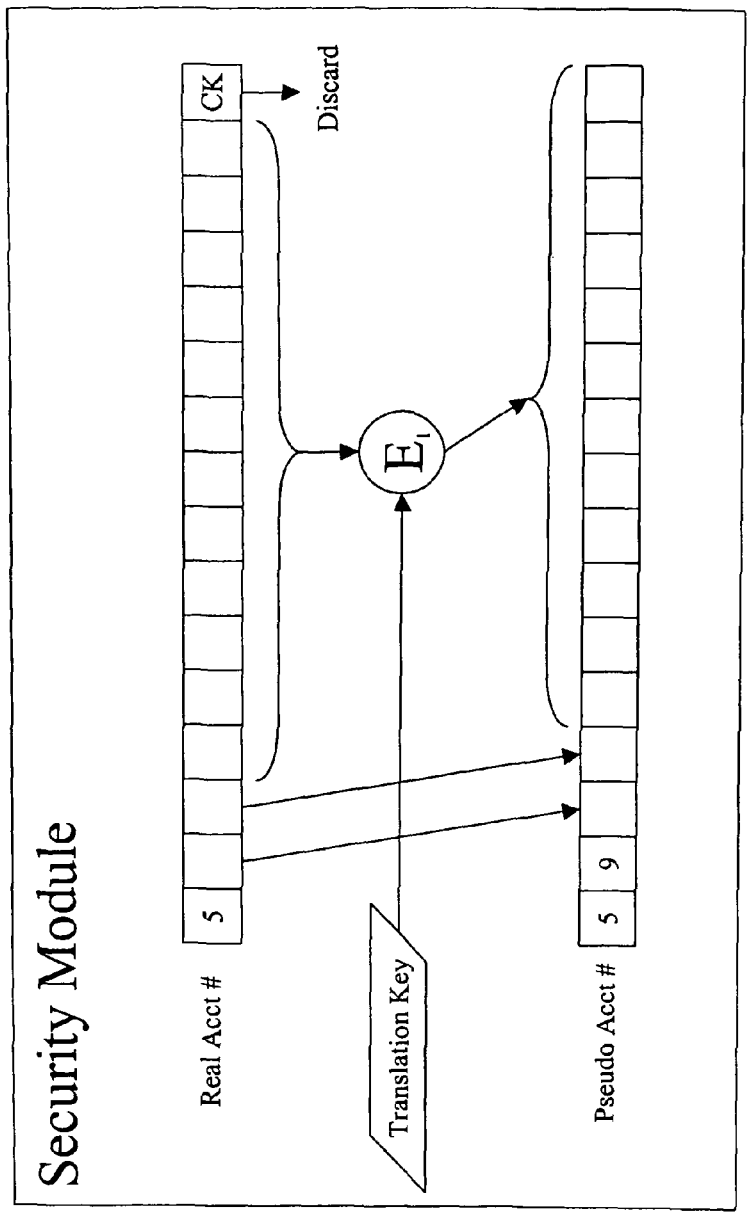
FIG. 3A is a block diagram illustrating the process preferably performed to obtain a pseudo account number for a given "real" account number, in accordance with the present invention.

FIG. 3 illustrates the process that may be performed within a security module to obtain the pseudo account number for a given "real" account number. The process utilizes the DEA with a double-length key. It is assumed that the security module holds a secret high-level key (the Account Number Translation Key) that consists of 16 bytes and is used with many or all card account numbers to obtain the pseudo account number that corresponds to each. It is assumed that the first three digits of the "real" account number occur unchanged in the pseudo account number with the digit "9" inserted between the first and second digits, and that the 16th digit (the check digit) of the "real" account number is ignored. The twelve digits from Digit 4 through Digit 15 of the "real" account number are encrypted and become digits 5 through 16 of the pseudo account number. This encryption is illustrated as function "E1" in FIG. 3a. This encryption method may use a methodology known as 'DESX' to maintain high security while minimizing the number of DEA operations that are required. The following defines possible steps to achieve the encryption:

1. Select the 6 digits from positions 4 through 9 of the "real" account number (the 6 left-most of the 12 account-number digits to be encrypted). Represent each digit as a 4-bit binary-coded decimal value.
2. Left-justify the 24 bits produced by Step 1 in a 64-bit field, where the 37 bits to the immediate right of these bits are all set to binary zero, and the three right-most bits of the 64-bits are set to binary '001'.

3. Exclusive-or the result of Step 2 with the left-most 8 bytes (64 bits) of the Account Number Translation Key.
4. DEA encrypt the result of Step 3 using as the key the right-most 8 bytes of the Account Number Translation Key.
5. Exclusive-or the result of Step 4 with (again) the left-most 8 bytes (64 bits) of the Account Number Translation Key.
6. Consider the result of Step 5 as 16 hexadecimal digits. Starting with the left-most digit, select those digits with the value of '9' or less until 6 such digits (from the binary set '0000' through '1001', decimal 0 through 9) have been selected. If fewer then 6 such digits were found, select the remaining digits by re-scanning the result of the Step 5, this time selection only those 4-bit digits with a value greater than binary '1001' (decimal '9'), and subtract binary '1010' (decimal '10') from each. This process produces 6 binary-coded-decimal digits.
7. Select the 6 digits from positions 10 through 15 of the "real" account number (the 6 right-most of the 12 account-number digits to be encrypted). Represent each digit as a 4-bit binary-coded decimal value. Mod-10 add each of these 6 binary-coded-decimal digits to the corresponding binary-coded-decimal digit resulting from Step 6.
8. Left-justify the 24 bits produced by Step 7 in a 64-bit field, where the 37 bits to the immediate right of these bits are all set to binary zero, and the three right-most bits of the 64-bits are set to binary '010'.
9. Exclusive-or the result of Step 8 with the left-most 8 bytes (64 bits) of the Account Number Translation Key.
10. DEA encrypt the result of Step 9 using as the key the right-most 8 bytes of the Account Number Translation Key.
11. Exclusive-or the result of Step 10 with (again) the left-most 8 bytes (64 bits) of the Account Number Translation Key.
12. Consider the result of Step 11 as 16 hexadecimal digits. Starting with the left-most digit, select those digits with the value of '9' or less until 6 such digits (from the binary set '0000' through '1001', decimal 0 through 9) have been selected. If fewer then 6 such digits were found, select the remaining digits by re-scanning the result of Step 11, this time selection only those 4-bit digits with a value greater than binary '1001' (decimal '9'), and subtract binary '1010' (decimal '10') from each. This process produces 6 binary-coded-decimal digits.
13. Mod-10 add each of the 6 binary-coded-decimal digits resulting from Step 12 to the corresponding binary-coded-decimal digit resulting from Step 1.
14. Left justify the 24 bits produced by Step 13 in a 64-bit field, where the 37 bits to the immediate right of these bits are all set to binary zero, and the three right-most bits of the 64-bits are set to binary '011'.
15. Exclusive-or the result of Step 14 with the left-most 8 bytes (64 bits) of the Account Number Translation Key.
16. DEA encrypt the result of Step 15 using as the key the right-most 8 bytes of the Account Number Translation Key.
17. Exclusive-or the result of Step 16 with (again) the left-most 8 bytes (64 bits) of the Account Number Translation Key.
18. Consider the result of Step 17 as 16 hexadecimal digits. Starting with the left-most digit, select those digits with the value of '9' or less until 6 such digits (from the binary set '0000' through '1001', decimal 0 through 9) have been selected. If fewer then 6 such digits were found, select the remaining digits by re-scanning the result of Step 17, this time selection only those 4-bit digits with a value greater than binary '1001' (decimal '9'), and subtract binary '1010' (decimal '10') from each. This process produces 6 binary-coded-decimal digits.
19. Mod-10 add each of the 6 binary-coded-decimal digits resulting from Step 18 to the corresponding binary-coded-decimal digit resulting from Step 7.
20. Left-justify the 24 bits produced by Step 19 in a 64-bit field, where the 37 bits to the immediate right of these bits are all set to binary zero, and the three right-most bits of the 64-bits are set to binary '100'.
21. Exclusive-or the result of Step 20 with the left-most 8 bytes (64 bits) of the Account Number Translation Key.
22. DEA encrypt the result of Step 21 using as the key the right-most 8 bytes of the Account Number Translation Key.
23. Exclusive-or the result of Step 22 with (again) the left-most 8 bytes (64 bits) of the Account Number Translation Key.
24. Consider the result of Step 23 as 16 hexadecimal digits. Starting with the left-most digit, select those digits with the value of '9' or less until 6 such digits (from the binary set '0000' through '1001', decimal 0 through 9) have been selected. If fewer then 6 such digits were found, select the remaining digits by re-scanning the result of Step 23, this time selection only those 4-bit digits with a value greater than binary '1001' (decimal '9'), and subtract binary '1010' (decimal '10') from each. This process produces 6 binary-coded-decimal digits.
25. Mod-10 add each of the 6 binary-coded-decimal digits resulting from Step 24 to the corresponding binary-coded-decimal digit resulting from Step 13.
26. Left-justify the 24 bits produced by Step 25 in a 64-bit field, where the 37 bits to the immediate right of these bits are all set to binary zero, and the three right-most bits of the 64-bits are set to binary '101'.
27. Exclusive-or the result of Step 26 with the left-most 8 bytes (64 bits) of the Account Number Translation Key.
28. DEA encrypt the result of Step 27 using as the key the right-most 8 bytes of the Account Number Translation Key.
29. Exclusive-or the result of Step 28 with (again) the left-most 8 bytes (64 bits) of the Account Number Translation Key.
30. Consider the result of Step 29 as 16 hexadecimal digits. Starting with the left-most digit, select those digits with the value of '9' or less until 6 such digits (from the binary set '0000' through '1001', decimal 0 through 9) have been selected. If fewer then 6 such digits were found, select the remaining digits by re-scanning the result of Step 29, this time selection only those 4-bit digits with a value greater than binary '1001' (decimal '9'), and subtract binary '1010' (decimal '10') from each. This process produces 6 binary-coded-decimal digits.
31. Mod-10 add each of the 6 binary-coded-decimal digits resulting from Step 30 to the corresponding binary-coded-decimal digit resulting from Step 19.

32. Concatenate left-to right (1) four decimal digits consisting of the left-most 3 decimal digits of the "real" account number with the digit '9' inserted between the first and second digit, with (2) the 6 decimal digits resulting from Step 25, with (3) the 6 decimal digits resulting from Step 31. Use the resulting 16 decimal digits as the pseudo account number.

Figure 3B:
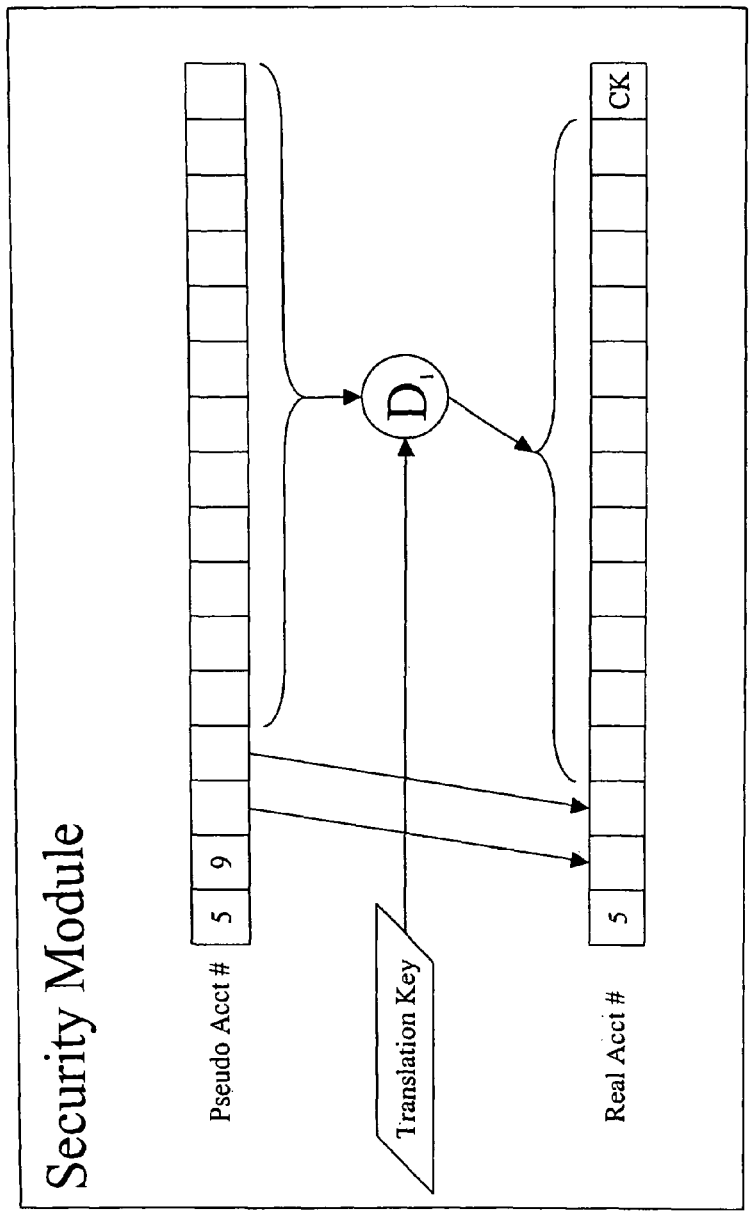
FIG. 3B is a block diagram illustrating the process preferably performed to convert a pseudo account number back into its corresponding "real" account number.

FIG. 3b illustrates the process performed by a security module in the acquirer's facility to convert a pseudo account number (created from a "real" account number using the procedure described in FIG. 3a) back into its corresponding "real" account number. The process utilizes the DEA with a double-length key. It is assumed that the security module holds a secret high-level key (the Account Number Translation Key) that consists of 16 bytes and is used with many or all card account numbers to obtain the pseudo account number from "real" account numbers and vice-versa. It is assumed that the first three digits of the "real" account number occur unchanged in the pseudo account number with the digit "9" inserted between the first and second digits, and that 16th digit (the check digit) of the "real" account number is not included in the pseudo account number. Therefore to convert from a pseudo account number to a "real" account number it is necessary to decrypt Digit 5 through Digit 16 of the pseudo account number to provide Digit 4 through Digit 15 of the "real" account number. The decryption is illustrated as function "D1" in FIG. 3b. Digit 1 through Digit 3 of the "real" account number are obtained from Digit 1 through Digit 4 of the pseudo account number by discarding the second digit (always a '9'). Finally, the 16th digit of the "real" account number must be computed from the other 15 digits by applying an appropriate check-digit-generation algorithm. The translation process is as follows:

1. Select the 6 digits from positions 5 through 10 of the pseudo account number (the 6 left-most of the 12 pseudo account-number digits to be decrypted). Represent each digit as a 4-bit binary-coded decimal value.
2. Left-justify the 24 bits produced by Step 1 in a 64-bit field, where the 37 bits to the immediate right of these bits are all set to binary zero, and the three right-most bits of the 64-bits are set to binary '101'.
3. Exclusive-or the result of Step 2 with the left-most 8 bytes (64 bits) of the Account Number Translation Key.
4. DEA encrypt the result of Step 3 using as the key the right-most 8 bytes of the Account Number Translation Key.
5. Exclusive-or the result of Step 4 with (again) the left-most 8 bytes (64 bits) of the Account Number Translation Key.
6. Consider the result of Step 5 as 16 hexadecimal digits. Starting with the left-most digit, select those digits with the value of '9' or less until 6 such digits (from the binary set '0000' through '1001' (decimal 0 through 9) have been selected. If fewer then 6 such digits were found, select the remaining digits by re-scanning the result of the Step 5, this time selection only those 4-bit digits with a value greater than binary '1001' (decimal '9'), and subtract binary '1010' (decimal '10') from each. This process produces 6 binary-coded-decimal digits.
7. Select the 6 digits from positions 11 through 16 of the pseudo account number (the 6 right-most of the 12 account-number digits to be decrypted). Represent each digit as a 4-bit binary-coded decimal value. From each of these 6 binary-coded-decimal digits, subtract the corresponding binary-coded-decimal digit resulting from Step 6.
8. Left-justify the 24 bits produced by Step 7 in a 64-bit field, where the 37 bits to the immediate right of these bits are all set to binary zero, and the three right-most bits of the 64-bits are set to binary '100'.
9. Exclusive-or the result of Step 8 with the left-most 8 bytes (64 bits) of the Account Number Translation Key.
10. DEA encrypt the result of Step 9 using as the key the right-most 8 bytes of the Account Number Translation Key.
11. Exclusive-or the result of Step 10 with (again) the left-most 8 bytes (64 bits) of the Account Number Translation Key.
12. Consider the result of Step 11 as 16 hexadecimal digits. Starting with the left-most digit, select those digits with the value of '9' or less until 6 such digits (from the binary set '0000' through '1001', decimal 0 through 9) have been selected. If fewer then 6 such digits were found, select the remaining digits by re-scanning the result of Step 11, this time selection only those 4-bit digits with a value greater than binary '1001' (decimal '9'), and subtract binary '1010' (decimal '10') from each. This process produces 6 binary-coded-decimal digits.
13. Mod-10 subtract each of the 6 binary-coded-decimal digits resulting from Step 12 from the corresponding binary-coded-decimal digit resulting from Step 1.
14. Left-justify the 24 bits produced by Step 13 in a 64-bit field, where the 37 bits to the immediate right of these bits are all set to binary zero, and the three right-most bits of the 64-bits are set to binary '011'.
15. Exclusive-or the result of Step 14 with the left-most 8 bytes (64 bits) of the Account Number Translation Key.
16. DEA encrypt the result of Step 15 using as the key the right-most 8 bytes of the Account Number Translation Key.
17. Exclusive-or the result of Step 16 with (again) the left-most 8 bytes (64 bits) of the Account Number Translation Key.
18. Consider the result of Step 17 as 16 hexadecimal digits. Starting with the left-most digit, select those digits with the value of '9' or less until 6 such digits (from the binary set '0000' through '1001', decimal 0 through 9) have been selected. If fewer then 6 such digits were found, select the remaining digits by re-scanning the result of Step 17, this time selection only those 4-bit digits with a value greater than binary '1001' (decimal '9'), and subtract binary '1010' (decimal '10') from each. This process produces 6 binary-coded-decimal digits.
19. Mod-10 subtract each of the 6 binary-coded-decimal digits resulting from Step 18 from the corresponding binary-coded-decimal digit resulting from Step 7.
20. Left-justify the 24 bits produced by Step 19 in a 64-bit field, where the 37 bits to the immediate right of these bits are all set to binary zero, and the three right-most bits of the 64-bits are set to binary '010'.
21. Exclusive-or the result of Step 20 with the left-most 8 bytes (64 bits) of the Account Number Translation Key.
22. DEA encrypt the result of Step 21 using as the key the right-most 8 bytes of the Account Number Translation Key.
23. Exclusive-or the result of Step 22 with (again) the left-most 8 bytes (64 bits) of the Account Number Translation Key.

24. Consider the result of Step 23 as 16 hexadecimal digits. Starting with the left-most digit, select those digits with the value of '9' or less until 6 such digits (from the binary set '0000' through '1001', decimal 0 through 9) have been selected. If fewer then 6 such digits were found, select the remaining digits by re-scanning the result of Step 23, this time selection only those 4-bit digits with a value greater than binary '1001' (decimal '9'), and subtract binary '1010' (decimal '10') from each. This process produces 6 binary-coded-decimal digits.

25. Mod-10 subtract each of the 6 binary-coded-decimal digits resulting from Step 24 from the corresponding binary-coded-decimal digit resulting from Step 13.

26. Left-justify the 24 bits produced by Step 25 in a 64-bit field, where the 37 bits to the immediate right of these bits are all set to binary zero, and the three right-most bits of the 64-bits are set to binary '001'.

27. Exclusive-or the result of Step 26 with the left-most 8 bytes (64 bits) of the Account Number Translation Key.

28. DEA encrypt the result of Step 27 using as the key the right-most 8 bytes of the Account Number Translation Key.

29. Exclusive-or the result of Step 28 with (again) the left-most 8 bytes (64 bits) of the Account Number Translation Key.

30. Consider the result of Step 29 as 16 hexadecimal digits. Starting with the left-most digit, select those digits with the value of '9' or less until 6 such digits (from the binary set '0000' through '1001', decimal 0 through 9) have been selected. If fewer then 6 such digits were found, select the remaining digits by re-scanning the result of Step 23, this time selection only those 4-bit digits with a value greater than binary '1001' (decimal '9'), and subtract binary '1010' (decimal '10') from each. This process produces 6 binary-coded-decimal digits.

31. Mod-10 subtract each of the 6 binary-coded-decimal digits resulting from Step 30 from the corresponding binary-coded-decimal digit resulting from Step 19.

32. Concatenate, left-to-right, (1) the first four digits of the pseudo account number with the second digit (the '9') discarded (thus providing three digits) with (2) the 6 decimal digits resulting from Step 25 with (3) the 6 decimal digits resulting from Step 31. Compute the 16th (right-most) digit by applying the check-digit-generation algorithm to the 15 decimal digits resulting from the concatenation. The resulting 16 digits are the "real" account number.

Figure 4A:
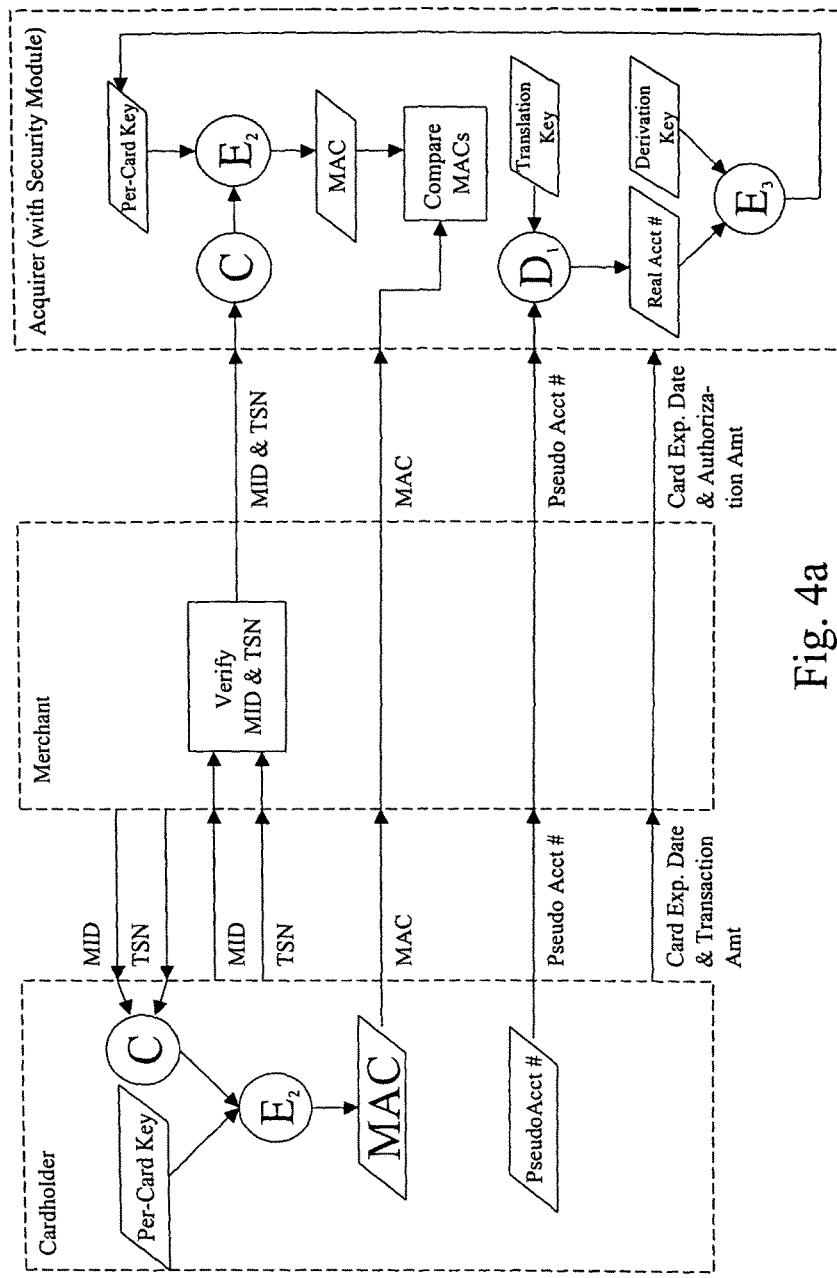
FIGS. 4A and 4B illustrate the steps that are performed in accordance with the present invention when a card holder places an order with a merchant on the Internet and the merchant requests an authorization from an acquirer.
Figure 4B:
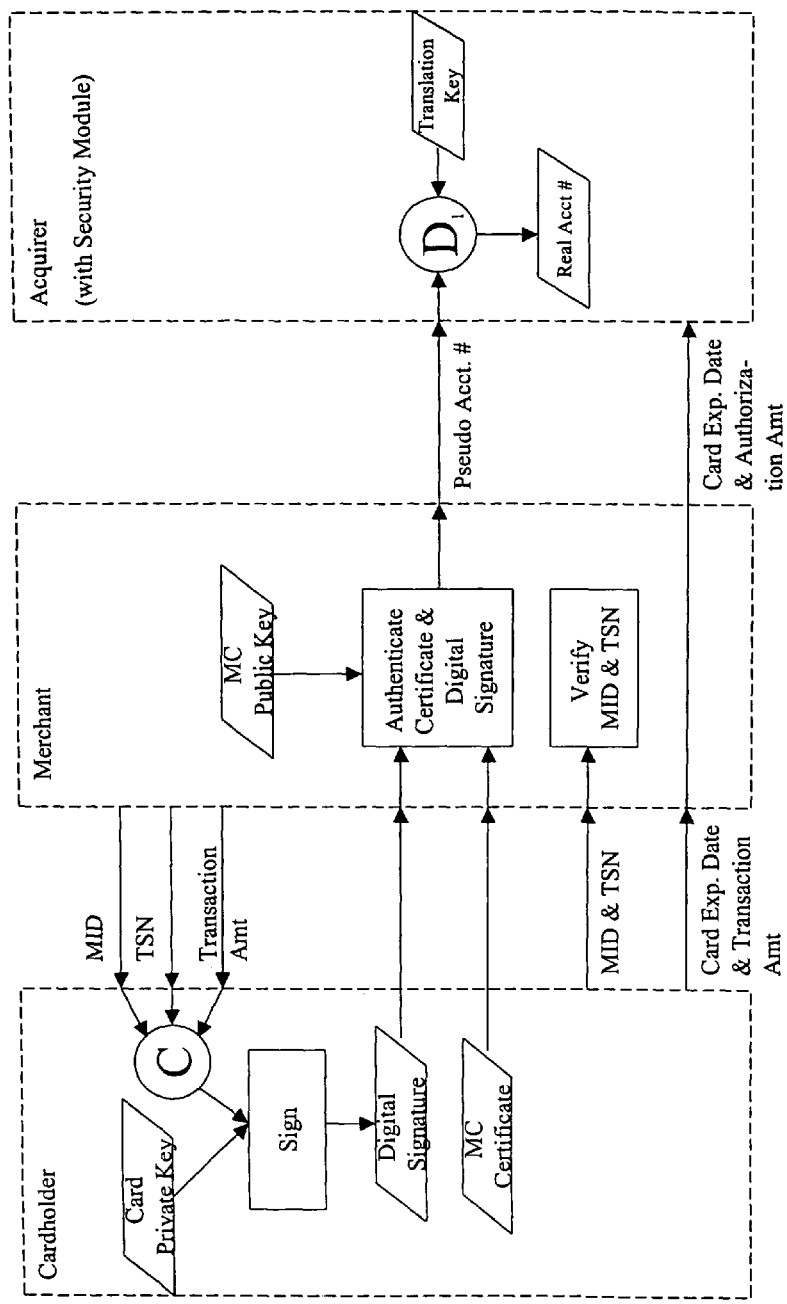

FIGS. 4a and 4b illustrate the steps that are performed when the cardholder contacts and places an order with a merchant on the Internet and the merchant requests an interchange authorization from an acquirer. It is assumed that the cardholder has enrolled in the MasterCard secure payment program and has installed the MasterCard secure payment application on his/her computer.

The cardholder contacts a merchant on (for example) the Internet and informs the merchant that he/she wishes to make a purchase.

The merchant responds by sending to the cardholder a merchant identification number ("MID") that has been given to it by its acquiring bank (which bank ensures that it gives a unique merchant identification number to each of its merchants), along with a transaction sequence number ("TSN") that is unique to this transaction. (This response is presumably generated within merchant software that the merchant obtained, for example, (1) from its acquiring bank, and that the acquiring bank had obtained from MasterCard, or (2) from the MasterCard Web site, or (3) from its software vendor, and that this vendor had obtained from MasterCard.) It is assumed that these are decimal numbers and that neither exceeds 8 digits.

The cardholder executes the MasterCard secure payment application software (if it is not already executing) and enters his/her password.

The application may display the cardholder's "real" and pseudo account numbers to the cardholder. The Internet merchants, however, never see the "real" account number.

The application concatenates the merchant identification number and the transaction sequence number (shown in FIGS. 4a and 4b as function "C"), then either:

1. With reference to FIG. 4a, when the cardholder uses secret-key authentication, the cardholder generates a Message Authentication Code ("MAC") on the concatenated result, using the unique Per-Card Key placed by MasterCard in the secure payment application (shown in FIG. 4a as function "E2"). As an example of the generation of the MAC, the merchant identification number and the transaction sequence number, represented as binary-coded-decimal, are concatenated, and padded to the right with zeros to produce 16 hexadecimal digits. This is DEA encrypted using, as the key, the left 8-bytes of the Per-Card Key. This result is DEA decrypted using, as the key, the right 8 bytes of the Per-Card Key, and this second cryptographic result is DEA encrypted using, as the key, the left 8-bytes of the Per-Card Key. Finally the MAC itself is produced by taking the left-most 4 bytes of this 8-byte final result, discarding the right-most 4 bytes. Or:

2. With reference to FIG. 4b, when the cardholder uses public-key authentication, the cardholder creates a digital signature on the concatenated result of the merchant identification number and the transaction sequence number further concatenated with the transaction amount agreed to by the cardholder (all with appropriate padding) using the card-unique private key placed in the application by MasterCard (or its agent).

The MasterCard secure payment application then sends to the merchant, using SSL encryption, the following data:

1. the cardholder's pseudo account number alone (secret-key authentication) or the card-unique digital certificate (public-key authentication) that includes the card's pseudo account number;
2. the cardholder's card expiration date;
3. the merchant identification number and transaction sequence number as received from the merchant;
4. the MAC (secret-key authentication) or the digital signature (public-key authentication) generated by the secure payment application;
5. the transaction amount agreed to by the cardholder.

In some cases, the secure payment application may also send data in the transaction record indicating that the account number transmitted is a pseudo account number.

The merchant, using the MasterCard-application software, verifies that the merchant identification number and the transaction sequence number are the correct numbers for this transaction.

If the transaction uses public-key authentication (FIG. 4b), the merchant, using the MasterCard-application software:
1. Selects the MasterCard "root" public key indicated by the "root" key identifier in the card's digital certificate (which public keys are included in the MasterCard application software).
2. Uses this "root" public key to authenticate the card's digital certificate.
3. Uses the card's public key to authenticate the appropriate transaction data.
4. Either (a) rejects the transaction if either authentication process fails, or (b) logs all of the data related to the certificate and the transaction signature (so that the merchant can subsequently demonstrate that it successfully verified the certificate and signature).

The merchant verifies that the pseudo account number starts with a "5". The merchant may also verify that the second digit is a "9" for a MasterCard pseudo account number.

The merchant may approve the transaction without authorization if that is its practice or it may pass the pseudo account number and card expiration date to the acquiring bank. If secret-key authentication is used (see FIG. 4a), the merchant additionally passes to the acquiring bank the merchant identification number, transaction sequence number, and MAC.

The transaction amount passed from the cardholder to the merchant may be different from the transaction amount passed from the merchant to the acquirer. Therefore, the latter amount is referred to as "authorization amount" in FIGS. 4a and 4b.

The acquirer receiving the authorization request from the merchant recognizes that it contains a pseudo account number (by the '9' as the second digit, and/or by the inclusion of the fields not found in a conventional authorization request) and sends to its MasterCard-provided security module the pseudo account number. If secret-key authentication is performed, the acquirer additionally sends to the security module (a) the merchant identification number, (b) the transaction sequence number, and (c) the MAC produced by the cardholder's secure application.

Upon receipt of this data, the security module cryptographically processes the pseudo account number to produce the "real" account number as described above with reference to FIG. 3b. (The translation is shown in FIGS. 4a and 4b as using function "D1".)

If secret-key authentication is required (see FIG. 4a), the security module additionally performs the following steps:
1. Generates the Per-Card Key, unique to the card of this transaction, using the "real" account number and the Per-Card Key Derivation Key as defined previously. (The generation of the Per-Card Key is shown in FIG. 4a as using function "E3".)
2. Uses this just-derived key to create a MAC on the merchant identification number and the transaction sequence number, as defined previously.
3. Compares this generated MAC with the MAC given to it with the transaction data, and rejects the transaction if the two versions of the MAC are not identical.
4. If the two versions of the MAC are identical, outputs the "real" account number.

Once the acquirer has obtained the "real" account number from the security module, it combines this with the expiration date from the transaction data. The acquirer may process the resulting transaction internally in its own facility if it is a provider of such processing services, or it may pass the transaction on to MasterCard over Banknet communication lines for MasterCard to send to the issuer in a conventional mode.

The response received by the acquirer from the issuer is identical in all respects to conventional processing, and provides an approval or rejection based on the "real" account number.

If the acquirer passes the account number to the merchant as part of its response, it must first convert the "real" account number back into a pseudo account number using the appropriate cryptographic key stored in the security module, and using the previously-discussed process.

Figure 5:
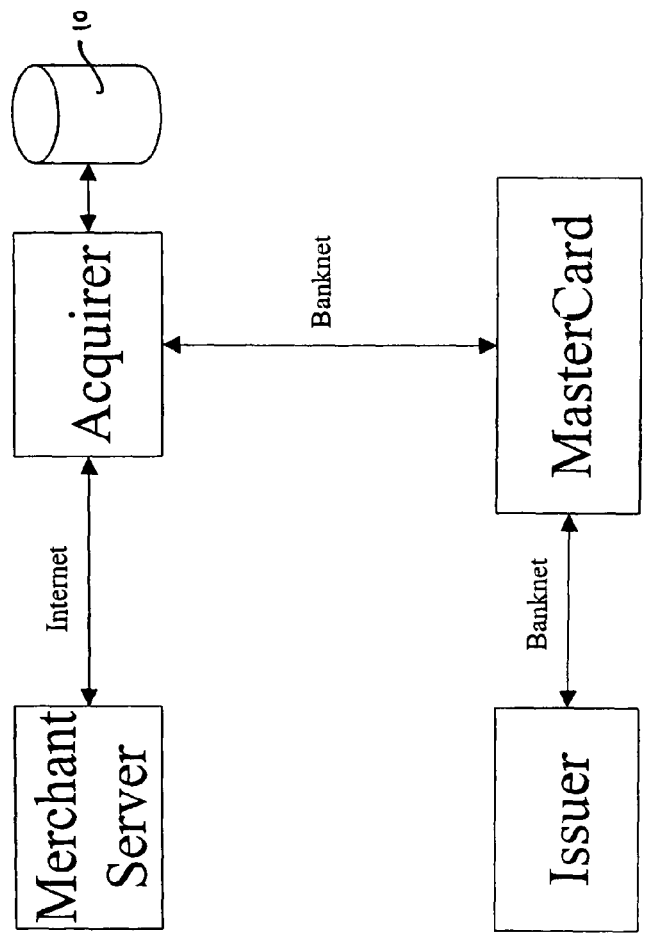
FIG. 5 is a block diagram illustrating the process of clearing a transaction in accordance with the present invention.

FIG. 5 illustrates the process of clearing a transaction. The merchant sends all the transactions to the acquirer at the end of the day or periodically during the day. Each of these transactions includes all of the conventional MasterCard transaction details, except that they may contain a pseudo account number rather than a "real" account number. The acquirer takes all of the pseudo account numbers from these transactions and processes them through the MasterCard-provided security module, thus converting pseudo account numbers to "real" account numbers. The acquirer then processes the transactions internally or routes them to MasterCard International for clearing to the issuer in a conventional manner.

Figure 6:
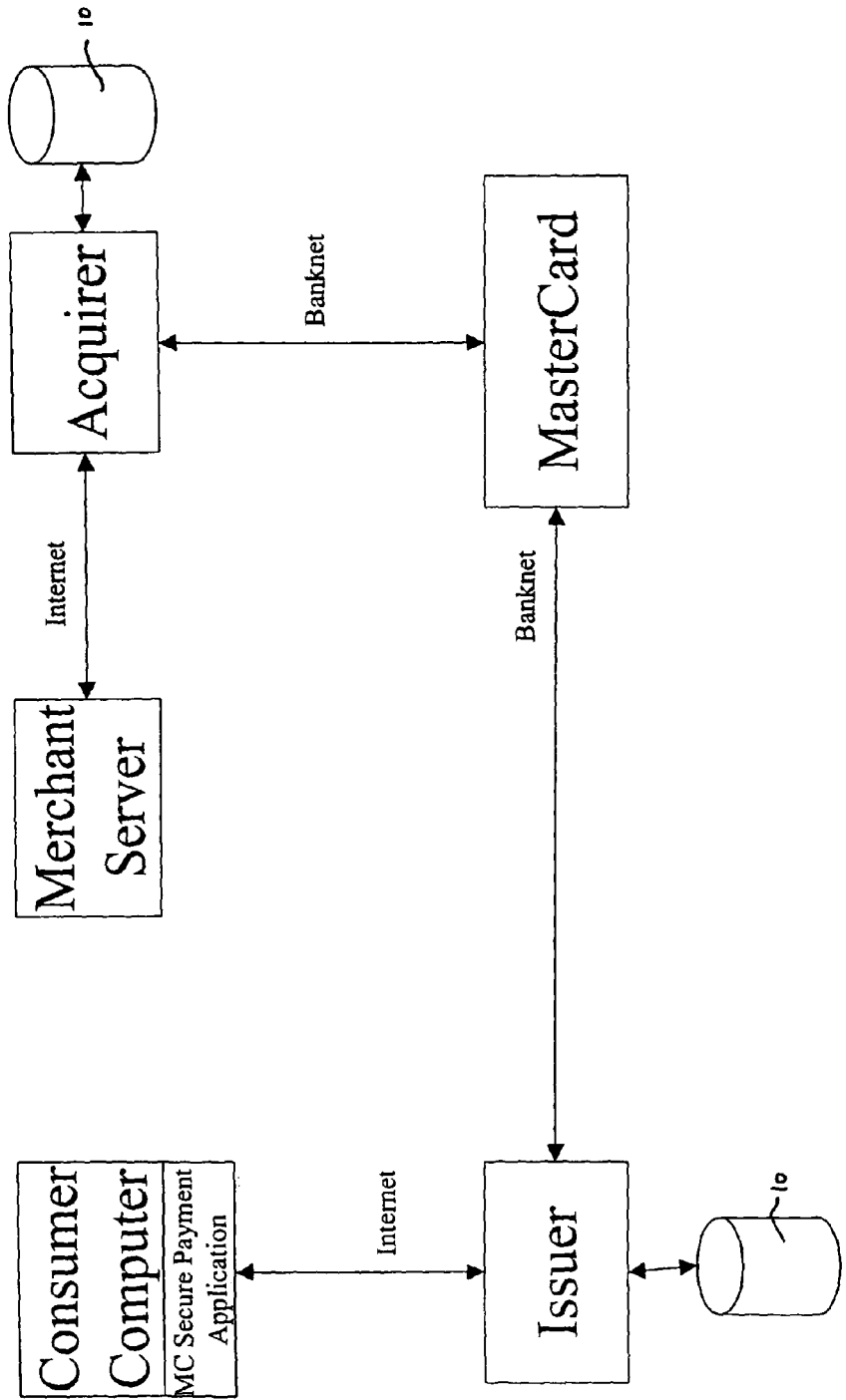
FIG. 6 is a block diagram illustrating exception processing in accordance with the present invention.

FIG. 6 illustrates how charge-backs, retrieval requests, etc., are processed in the MasterCard interchange. The figure shows that both the acquirer and the issuer have security modules 10. However, the issuer need not have a security module unless it will take cardholder inquiries over the Internet and unless the cardholder's computer communicates with the issuer by outputting a pseudo account number rather than a "real" account number. In this situation the issuer needs a security module in order to be able to convert the pseudo account number to the "real" account number. The issuer does not need a security module if the cardholder communicates with the issuer through postal mail.

The acquirer may have a security module in order to be able to process a transaction as a second presentment or retrieval request fulfillment from a merchant, where the merchant can only reference the transaction with a pseudo account number. Therefore the MasterCard-provided security module at the acquiring bank's facility needs the capability to translate from "real" account numbers to pseudo account numbers as well as from pseudo account numbers to "real" account numbers.

The transactions that go through MasterCard will be routed through Banknet with the "real" account number and not the pseudo account number. If secret-key authentication is used, it may be necessary for the acquirer to confirm that the transaction sequence number is unique for the merchant in question. If public-key authentication is used, it may be necessary for the merchant to produce the card's digital certificate, its signature, the cardholder-agreed transaction amount, the merchant identification number and the transaction sequence number, so that it can demonstrate that it actually verified the certificate and signature.

When public-key authentication is used, the above discussion considers a one-level key hierarchy in which MasterCard itself directly signs the certificate for every card. However a multi-level hierarchy is also possible. For example, MasterCard might sign a certificate for each of its issuers, and the issuer would in turn sign the certificates for the cards it issued. This would be an example of a two-level hierarchy.

Advantageously, the present invention provides enhanced security for the use of payment account numbers over the Internet. With the present invention, if one or more pseudo account numbers were to be stolen from a merchant, the stolen pseudo account numbers could not be used to conduct fraudulent transactions because transactions based on pseudo account numbers are preferably cryptographically authenticated using a secret key that is unique for each account number. This secret key is located only within the cardholder's secure payment application. Furthermore, a pseudo account number can not be used to make conventional MasterCard transactions (at point-of-sale terminals, for example) because the pseudo account number does not disclose the "real" account number.

The foregoing merely illustrates the principles of the invention. It will thus be appreciated that those skilled in the art will be able to devise numerous systems and methods which, although not explicitly shown or described herein, embody the principles of the invention and thus within the spirit and scope of the invention.

We claim:

1. A method of conducting transactions by a purchaser over a communications network, comprising:
   (a) assigning to said purchaser a first payment account number having a length and a status that changes over time;
   (b) providing a pseudo account number distinct from said first payment account number, associated with said first payment account number, and having the same length as said first payment account number, wherein the providing is based upon said first payment account number and a translation key, wherein the providing said pseudo account number further comprises
      selecting six decimal digits from said first payment account number,
      expanding each of said six decimal digits into a four-bit binary code to result in a 24-bit string,
      assigning a leftmost portion of a 64-bit field to said 24-bit string,
      assigning a rightmost three-bit field of said pseudo account number to binary '001,
      assigning a remaining portion of said 64-bit field between said leftmost portion and said rightmost portion to binary zeros,
      comparing said 64-bit field to said translation key with a logical operation,
      encrypting, using an encryption algorithm, a result of said comparing,
      converting said result into binary-coded decimal digits, and concatenating said binary-coded decimal digits;
   (c) processing, using a processor, one or more authorization requests corresponding to one or more transactions, each of the one or more transactions conducted using said pseudo account number, the processing of each of the one or more authorization requests comprising:
      (i) receiving a first authorization request of the one or more authorization requests for payment of a corresponding first transaction, said first authorization request including: (I) said pseudo account number and not said first payment account number, and (II) a cryptographic code generated based on a secret key associated with said first payment account number and transaction-specific data;
      (ii) identifying said purchaser's first payment account number in response to said first authorization request;
      (iii) verifying the authenticity of said cryptographic code;
      (iv) responding to said first authorization request based upon said verifying and said status of said first payment account number at the time of said corresponding first transaction; and
      (v) repeating steps (i)-(iv) for each remaining authentication request of the one or more authentication requests.

2. The method of claim 1, wherein said cryptographic code is a message authentication code (MAC).

3. The method of claim 1, wherein said cryptographic code is a digital signature.

4. The method of claim 1, wherein said first payment account number is assigned by an assigning computer and said status is a function of the credit balance available for use by said purchaser, which credit balance changes over time as a result of the purchases made by said purchaser.

5. The method of claim 4, wherein said pseudo account number is provided to a purchaser computer by an issuer computer, and providing said pseudo account number comprises:
   (i) receiving identification information from said purchaser computer at said issuer computer;
   (ii) verifying said identification information by said issuer computer, and
   (iii) after verifying said identification information, providing secure payment software comprising said pseudo account number to said purchaser computer by said issuer computer.

6. The method of claim 5, wherein said issuer computer provides secure payment software configured with functionality to send to a merchant computer at least one of
   (i) said pseudo account number and a digital certificate that includes said pseudo account number,
   (ii) a card expiration date,
   (iii) a merchant identification number, and
   (iv) one or both of a generated message authentication code (MAC) and a digital signature generated by said secure payment software.

7. The method of claim 1, wherein providing said pseudo account number comprises providing an indication that said pseudo account number is not a payment account number.

8. The method of claim 7, wherein providing said indication comprises providing an indicator digit and transaction record data.

9. The method of claim 7, wherein providing said indication comprises providing transaction record data.

10. A system for conducting transactions by a purchaser over a communications network, comprising:
   an assigning computer configured to assign to said purchaser a first payment account number having a length and a status that changes over time;
   an issuing computer configured to provide a pseudo account number distinct from said first payment account number, associated with said first payment account number, and having the same length as said first payment account number, by using said first payment account number and a translation key, wherein said issuing computer is further configured to
      select six decimal digits from said first payment account number,
      expand each of said six decimal digits into a four-bit binary code to result in a 24-bit string, assign a leftmost portion of a 64-bit field to said 24-bit string, assign a rightmost three-bit field of said pseudo account number to binary '001, assign a remaining portion of said 64-bit field between said leftmost portion and said rightmost portion to binary zeros, compare said 64-bit field to said translation key with a logical operation, encrypt, using an encryption algorithm, a result of said comparing, convert said result into binary-coded decimal digits, and concatenating said binary-coded decimal digits; and an authorizing computer configured to process one or more authorization requests corresponding to one or more transactions, each of the one or more transactions conducted using said pseudo account number, by (i) receiving a first authorization request of the one or more authorization requests for payment of a corresponding first transaction, said first authorization request including: (I) said pseudo account number and not said first payment account number, and (II) a cryptographic code generated based on a secret key associated with said first payment account number and transaction-specific data;

(ii) identifying said purchaser's first payment account number in response to said first authorization request;

(iii) verifying the authenticity of said cryptographic code;

(iv) responding to said first authorization request based upon said verifying and said status of said first payment account number at the time of said corresponding first transaction; and (v) repeating steps (i)-(iv) for each remaining authentication request of the one or more authentication requests.

11. The system of claim 10, wherein said cryptographic code is a message authentication code (MAC).

12. The system of claim 10, wherein said cryptographic code is a digital signature.

13. The system of claim 10, wherein one or more of said assigning computer, said issuing computer, and said authorizing computer are comprised of the same computer.

14. The system of claim 10, wherein said status is a function of the credit balance available for use by said purchaser, which credit balance changes over time as a result of the purchases made by said purchaser.

15. The system of claim 14, wherein said issuer computer is further configured to
   (i) receive identification information from said purchaser computer;
   (ii) verify said identification information by said issuer computer, and
   (iii) after verifying said identification information, provide secure payment software comprising said pseudo account number to said purchaser computer.

16. The system of claim 15, wherein said secure payment software has functionality to send to a merchant computer at least one of
   (i) said pseudo account number and a digital certificate that includes pseudo account number,
   (ii) a card expiration date,
   (iii) a merchant identification number, and
   (iv) one or both of a generated message authentication code (MAC) and a digital signature generated by said secure payment software.

17. The system of claim 10, wherein said issuing computer is further configured to provide an indication that said pseudo account number is not a payment account number.

18. The system of claim 17, wherein said indication comprises an indicator digit.

19. The system of claim 17, wherein said indication comprises transaction record data.

20. The method of claim 1, wherein the pseudo account number is useable only during a pre-determined time period after it is provided.

21. The system of claim 10, wherein the pseudo account number is useable only during a pre-determined time period after it is provided.

22. The method of claim 1, wherein the secret key is computed using a derivation key based on a real account number associated with the purchaser's payment card.

23. The system of claim 10, wherein the secret key is computed using a derivation key based on a real account number associated with the purchaser's payment card.

* * * * *